United States Patent [19]
Walsh

[11] Patent Number: 4,861,832
[45] Date of Patent: Aug. 29, 1989

[54] FLEXIBLE EPOXY FILM FROM AN EPOXY RESIN REACTED WITH A KETIMINE/AMINE TERMINATED BUTADIENE/ACRYLONITRILE COPOLYMER BLEND

[75] Inventor: Michael L. Walsh, Erie, Pa.

[73] Assignee: Lord Corporation, Erie, Pa.

[21] Appl. No.: 176,896

[22] Filed: Apr. 4, 1988

[51] Int. Cl.$^4$ .................. C08L 61/20; C08L 63/02
[52] U.S. Cl. .................................. 525/113; 525/939
[58] Field of Search .............................. 525/113, 939

[56] References Cited

U.S. PATENT DOCUMENTS

| | | | |
|---|---|---|---|
| 4,129,670 | 12/1978 | Riew | 525/529 |
| 4,198,331 | 4/1980 | Buchwalter et al. | 525/507 |
| 4,298,656 | 11/1981 | Mendelsohn | 525/113 |
| 4,427,802 | 1/1984 | Moulton et al. | 525/113 |
| 4,557,814 | 12/1985 | Schupp et al. | 525/510 |
| 4,769,420 | 9/1988 | Schwerzel et al. | 528/113 |

Primary Examiner—John C. Bleutge
Assistant Examiner—Robert E. L. Sellers, II
Attorney, Agent, or Firm—Larson and Taylor

[57] ABSTRACT

A two-component epoxy resin composition of improved cure rate is provided through the mixture of:
  A. an epoxy resin component, and
  B. a hardener component of curing Component A comprising a mixture of a ketimine and an amine-terminated butadiene/acrylonitrile copolymer rubber in a weight ratio of ketimine to said copolymer rubber of 47.1 to 12.5:52.9 to 87.5.

11 Claims, 1 Drawing Sheet

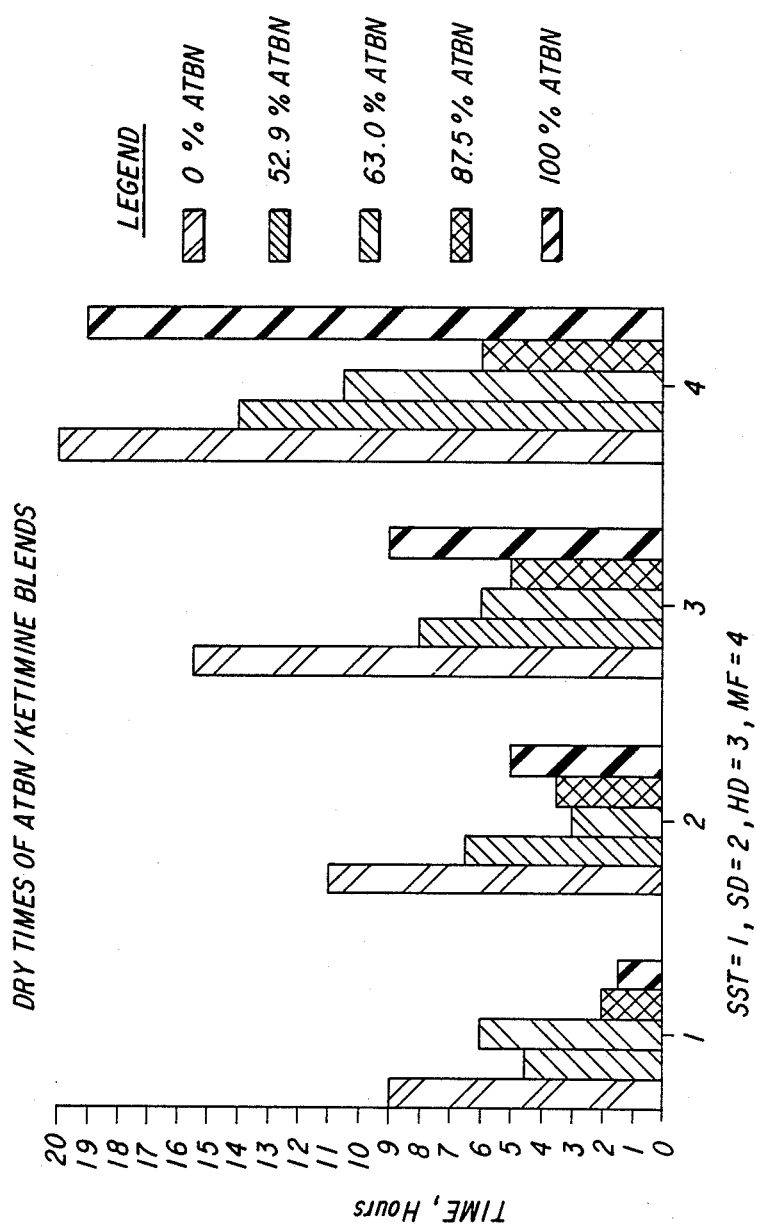

FLEXIBLE EPOXY FILM FROM AN EPOXY RESIN REACTED WITH A KETIMINE/AMINE TERMINATED BUTADIENE/ACRYLONITRILE COPOLYMER BLEND

BACKGROUND OF THE INVENTION

This invention relates to two-component epoxy resin formulations comprised of an epoxy resin component and a hardener component. More particularly, the invention is directed to a two-component epoxy resin composition composed of an epoxy resin component and a hardener component comprised of a part mixture of curing agents for curing the epoxy resin component.

Epoxy resins are well known compositions which have found a wide variety of uses when reacted with curing agents. Amongst the standard epoxy curing agents for epoxy resins are aliphatic or alicyclic amines, amine-terminated liquid polymers, ketimines, polyamides and the like. (See U.S. Pat. Nos. 4,298,656; 3,873,638, 4,557,814, 4,596,844 and 4,198,331.) Also, amine-terminated butadiene/acrylonitrile copolymer rubbers have been used as curing agents to impart flexibility to the epoxy resins. (See U.S. Pat. Nos. 4,129,670 and 4,107,116.) While these materials are useful curing agents for epoxy resins, they possess a cure rate that is less than satisfactory and, in most instances, are found lacking in one or more of other characteristics desired of epoxy resin compositions such as pot life, tensile strength, corrosion resistance, sprayability and cost. Attempts to improve on one or more of these properties has unfortunately resulted in an unacceptable degradation or reduction in other of the desired properties.

Accordingly, it is an object of the invention to provide a two-component epoxy resin composition comprised of an epoxy resin component and a hardener component which when mixed provides a composition having an improved cure rate and extended pot life and when cured results in a thermosetting composition possessing excellent flexibility, excellent adhesive performance, good recoatability and good corrosion and chemical resistance properties.

SUMMARY OF THE INVENTION

These and other objects of the invention are provided by a two-component epoxy resin composition of the invention comprising:

A. an epoxy resin component, and

B. a hardener component for curing the epoxy resin component comprised of a mixture of a ketimine and an amine-terminated butadiene/acrylonitrile copolymer rubber in a weight ratio of ketimine to said copolymer rubber of 47.1 to 12.5: 52.9 to 87.5.

Use of a combination of ketimine and amine-terminated butadiene/acrylonitrile copolymer rubber curing agents, in defined proportions, has been found to unexpectedly provide a faster cure rate at low temperatures than either of the curing agents alone. Moreover, the combination of curing agents is able to effect this rapid cure without unduly adversely affecting other aforementioned properties desired in an epoxy resin composition. In addition, the curing agents of the invention when blended together result in a low viscosity, high solids hardener component which when mixed with the epoxy resin component form a mixture than can be applied to a vertical substrate through airless spray applications to thicknesses greater than 20 mils.

BRIEF DESCRIPTION OF THE DRAWING

FIG. 1 is a graph reporting the cure rates of the formulations tested in working Example II.

DETAILED DESCRIPTION OF THE INVENTION

Component A

The epoxy resin component A of the invention is comprised of one or more of the curable resins containing more than one 1,2-epoxy group per molecule. Thus, the epoxy compounds which are suitable for use in the practice of the invention can be any monomeric or polymeric compound or mixtures of compounds having an epoxy equivalency greater than one, that is, wherein the average number of epoxy groups per molecule is greater than one, with monomeric epoxides having two epoxy groups being currently preferred. Epoxy compounds are well known. See, for example, U.S. Pat. Nos. 2,467,171; 2,615,007; 2,716,123; 3,030,336; and 3,053,855. Useful epoxy compounds include the polyglycidyl ethers of polyhydric polyols, such as ethylene glycol, triethylene glycol, 1,2-propylene glycol, 1,5-pentanediol, 1,2,6-hexanetriol, glycerol and 2,2-bis(4-hydroxy cyclohexyl) propane; the polyglycidyl esters of aliphatic or aromatic polycarboxylic acids, such as oxalic acid, succinic acid, glutaric acid, terephthalic acid, 2,6-naphthalene dicarboxylic acid and dimerized linoleic acid; the polyglycidyl ethers of polyphenols, such as bis-phenol A, 1,1-bis(4-hydroxyphenyl) ethane, 1,1-bis(4-hydroxyphenyl)isobutane, and 1,5-dihydroxynaphthalene; and novolak resins; with the aromatic and cycloaliphatic polyglycidyl compounds being currently preferred. Generally, the preferred epoxy compounds are resins having an epoxide equivalent weight of about 100 to 2000, preferably about 110 to 500.

If desired, the epoxy resin component of the invention may contain other materials known to enhance properties desired in epoxy resin adhesives as, for example, polyacrylate and polymethacrylate esters. The polyacrylate and polymethacrylate esters commonly added to epoxy resin adhesives contain more than one terminal acrylate or methacrylate group and are the acrylic and methacrylic esters of aliphatic polyhydric alcohols such as, for example, the di- and polyacrylates and the di- and polymethacrylates of alkylene glycols, alkoxylene glycols, alicyclic glycols and higher polyols, such as ethylene glycol, triethylene glycol, tetraethylene glycol, tetramethylene glycol, hexanediol, trimethylolethane, trimethylolpropane, pentaerythritol, dipentaerythritol, tripentaerythritol and the like, or mixtures of these with each other or with their partially esterified analogs.

Illustrative of these esters are trimethylolpropane triacrylate, trimethlolethane traicrylate, trimethylolpropane trimethyacrylate, trimethylolethane trimethacrylate, tetramethylene glycol dimethacrylate, ethylene glycol dimethacrylate, triethylene glycol dimethacrylate, pentaerythritol triacrylate, pentaerythritol tetraacrylate, 1,6-hexanediol diacrylate, 1,5-hexanediol dimethacrylate, dipentaerythritol tetraacrylate, dipentaerythritol pentaacrylate, and the like. Particularly preferred esters are 1,6-hexanediol diacrylate, trimethylolpropane triacrylate, pentaerythritol triacrylate, and pentaerythritol tetraacrylate.

Also suitable addenda are the acrylate or methacrylate esters of epoxide resin, wherein epoxide resins as used herein are considered to be polyols. The epoxide resins useful in reacting with acrylic or methacrylic acid are those epoxide resins described hereinbefore. The procedures for preparing these acrylate and methacrylate esters of epoxide resins is described in U.S. Pat. No. 3,377,406 which is hereby incorporated by reference.

When employed, the polyacrylate and polymethacrylate esters are usually present in an amount of about 10 to 20 parts by weight based on the total weight of Component A.

Component B

Component B is the hardener component of the epoxy resin composition and is comprised of a combination of an amine-terminated butadiene/acrylonitrile rubber and a ketimine curing agent. The combination of curing agents is essential to the invention for, as discussed above, it provides an unexpectedly faster cure rate than either curing agent above while maintaining other properties and performance characteristics desired in the final composition.

The amine-terminated butadiene/acrylonitrile (ATBN) curing agents are liquid elastomers that normally contain an acrylonitrile content of about 5 to 40, preferably 7 to 20 percent by weight and a butadiene content of 95 to 60, preferably 93 to 80 percent by weight, based on the liquid butadiene/acrylonitrile copolymer. Generally, the amine-terminated butadiene/acrylonitrile copolymers contain an average from about 1.7 to about 3 primary and/or secondary amine groups per molecule, preferably about 1.7 to about 2.3 primary or secondry amine groups per molecule and may have Brookfield viscosities measured at 27° C. of about 500 cps to about 2,500,000 cps, preferably about 500 cps to about 500,000 cps. The amine-terminated butadiene/acrylonitrile copolymers of the invention are well known articles or commerce and can be prepared by reacting a carboxyl-terminated or ester-terminated butadiene/acrylonitrile copolymer with at least one aliphatic, alicyclic or heterocyclic amine containing at least two primary and/or secondary amine groups. The amine-terminated liquid copolymers may also be prepared by reacting an acid chloride-terminated butadiene/acrylonitrile with at least one of the aforementioned amines. The methods of preparation are described in more detail in, for instance, U.S. Pat. No. 4,129,670, hereby incorporated by reference.

The preferred amine-terminated butadiene/acrylonitrile copolymer rubbers are those capped with a secondary amine such as pipeazine. Particularly preferred is piperazine-terminated butadiene/acrylonitrile copolymer rubber having an acrylonitrile content of 10% and a functionality of approximately 2.

The ketimine curing agents combined with the amine-terminated ATBN curing agent to form the hardener component of the invention comprise the ketimines of ketones and primary amines reactive with epoxy resins. Ketimines of this type are well known in the prior art and are readily obtainable by the reaction of ketones and primary mono- and poly-amines with the withdrawal of water formed, for example, by azeotropic distillation.

Illustrative of suitable primary diamines are triethylene tetramine, diethylene triamine, epoxy adducts of triethylene tetramine, epoxy adducts of ethylenediamine, and epoxy adducts of diethylene triamine, ethylenediamine, 1,3-diaminopropane, 1,4-diaminobutane, 1,6-diaminohexane, 4,9-dioxadodecane-1,12-diamine, 4,4'-diaminodicyclohexylmethane and 9-aminomethylstearylamine. Amines, such as 2-(3-aminopropyl)cyclohexylamine, whose amino groups have different reactivities are particularly advantageous in some cases.

Other suitable polyamines include the polymeric polyamines having mean molecular weights $M_n$ of no more than about 3000. Examples of such polyamines are diamines which can be prepared by reductive cyanoethylation of polyols, such as polytetrahydrofuran. Products of this type contain terminal primary amino groups in the form of aminopropoxy groups.

Examples of primary monoamines useful in this invention include octylamine, laurylamine or stearylamine or amidoamines obtained from primary diamines and monocarboxylic acids, such as ethylexanoic acid or higher fatty acids.

Ketones reactable with the primary amines to provide the ketimines of the invention are those which, apart from the keto group, contain no groups which react with a primary amino group. Illustrative of suitable ketones are acetone, methyl ethyl ketone, methyl propyl ketone, methyl isopropyl ketone, methyl isobutyl ketone, methyl isoamyl ketone, methyl amyl ketone, diethyl ketone, dipropyl ketone and cyclohexanone. Particularly preferred is methyl isobutyl ketone.

The preferred ketimines are those having an amine value in the range of about 350 to 750 and particularly preferred are ketimines of diethylenetriamine and methylisobutyl ketone.

Optional Ingredients

Other reactive additives or ingredients are not required in the two-component epoxy compositions of the invention. However, chain extenders and catalysts may be used if desired. The amount of chain extender or catalyst may vary widely depending on the reactive functionalities of the epoxy resin, amine-terminated butadiene/acrylonitrile copolymer rubber and ketimine. Typical amounts of chain extender usually vary from about 0 to 60 parts by weight, more preferably from about 0 to 35 parts by weight per 100 parts of the epoxy resin.

Illustrative of suitable chain extenders are any of the difunctional materials known to those skilled in the art to be reactive with epoxy compounds. Such compounds include dibasic acids such as azelaic acid, phthalic acid and the like; and dimercaptans such as 1,6-hexanedithiol, 1,8-octanedithiol and the like. Also suitable as chain extenders are anhydrides such as maleic anhydride, succinic anhydride, phthalic anhydride, hexahydrophthalic anhydride and the like; diisocyanates such as 4,4'-dicyclopentylmethylene diisocyanate, 4,4'-diphenylmethylene diioscyanate, 2,4-tolylene diisocyanate, 2,6-tolylene diisocyanate, 1,4-phenylene diisocyanate and the like; di- and polyamines described in detail heretofore in connection with preparation of the amine-terminated liquid polymer and including the diamine made by reacting linoleic acid dimer with a diamine, ethylenediamine, N-(2-aminoethyl)piperazine and the like; and aliphatic dihalides containing from 1 to 12 carbon atoms, more preferably aliphatic dihalides containing from 1 to 8 carbon atoms wherein the halide is bromide and/or chloride, such as 1,4-dibromobutane, 1,3-dibromobutane, 1,4-dichlorobutane, 1,2-dichloroethane, 1,4-diiodobutane, 1,6-dichlorohexane, and the like.

Also suitable as chain extenders and/or cross-linkers are dihydric aromatic compounds containing from 6 to 24 carbon atoms, preferably from 6 to 18 carbon atoms. Suitable dihydric aromatic compounds include catechol, resorcinol, 3-hydroxybenzyl alcohol, 4-hydroxybenzyl alcohol, 1,3-dihydroxynaphthalene, 1,5-dihydroxynaphthalene, 1,7-dihydroxynaphthalene, and, even more preferably, bisphenols having the formula:

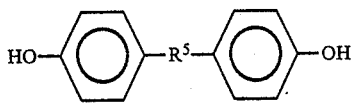

wherein $R^5$ is a bivalent radical containing 1 to 8 atoms of C, O, S and/or N, more preferably an alkylene or alkylidene group containing 1 to 8 carbon atoms, and even more preferably an alkylene or alkylidene group containing 1 to 6 carbon atoms. Examples of suitable bisphenols include methylene bisphenol, isopropylidene bisphenol, butylidene bisphenol, octylidene bisphenol, bisphenol sulfide, bisphenol sulfone, bishpenol ether, bisphenol amine and the like. Excellent results were obtained using isopropylidene bisphenol (bisphenol A).

Illustrative of suitable catalysts are tertiary amine catalysts such as tris(dialkylaminolkyl)phenols amongst which tris(dimethylaminomethyl)phenol is preferred, $BF_3$ amine complexes, imidazoles such as 2-ethyl-4-methylimidazole, etc. Catalysts if used to accelerate the reaction between the epoxy resin and ATBN will always be used in catalytic amounts usually falling in the range of 0 to 20 weight percent based on the combined weight of the epoxy resin, ketimine, ATBN copolymer and any chain extenders.

The extenders and catalyst, if employed, can be utilized in either Component A or Component B of the adhesive composition of the invention. However, it is preferred that the extenders by included in Component A and the catalyst in Component B.

When it is desired to enhance the non-sag characteristics of the adhesive compositions of the invention, the compositions may optionally include a mixture of a polyol and activated silica such as fumed silica.

It has been found that the activated silica combines with the polyol to provide hydrogen-bonding that is reactive with the amine groups of the curing agents of Component B to provide the thixotropic properties necessary to enhance non-sag characteristics of the adhesive composition.

The polyols that may be included in combination with the activated silica may be present in the form of the preferred tertiary amine phenol catalysts. Alternatively, the polyols may be the well-known articles of commerce commonly referred to as polyalkylene glycols or polyalkylene ether glycols. The latter may be represented by the formula $HO(RO)_nH$, in which R is an alkylene radical and n is at least 2. The alkylene radical can be a single chain or can consist of two or more alkylene chains separated from each other by an ether oxygen atom. Preferred poly(alkylene oxide) polyols have from 1 to 9, preferably 1 to 6 carbon atoms in the alkylene chain separating each pair of oxygen atoms and have a number average molecular weight in the range from about 100 to about 4000, preferably about 100 to about 2500. Not all the alkylene units need by the same. Poly(alkylene oxide) polyols formed by the copolymerization or condensation of mixtures of different cyclic ethers, glycols, or glycols and cyclic ethers can be used, as can poly(alkylene oxide) polyols derived from cyclic ethers such as dioxolane, which affords a polyol having the formula $HO(CH_2OCH_2CH_2O)_nH$, where n is greater than 1. The alkylene unit can be a straight or branched chain, as a poly(propylene oxide) polyol. In the case where the alkylene unit is ethylene, it can be advantageous to incorporate the unit into a copolymer, for example, as a copolymer of ethylene oxide and propylene oxide, with up to 80 percent of such copolymer comprising ethylene oxide. Representative poly(alkylene oxide) polyols include poly(ethylene oxide) polyols, poly(propylene oxide) polyols, poly(tetramethylene oxide) polyols, poly(nonamethylene oxide) polyols, poly(oxymethyleneethylene oxide) polyols, poly(ethylene oxide propylene oxide copolymer) polyols, and poly)pentaerythritolethylene oxide) polyols. Thus, the poly(alkylene oxide) polyols will generally have from 2 to 6 hydroxyl groups, with polyols having 2 hydroxyl groups being currently preferred. Particularly preferred is diethylene glycol.

When employed, the mixture of activated silica and polyol generally form part of Component A. The polyol is usually added in an amount of 0 to 5.0 parts per 100 parts of Component A and the activated silica in an amount of 100 to 400 parts per 100 parts of the polyol.

If desired, the epoxy resin component can be provided with amounts, preferably 5 to 500 parts per 100 parts of epoxy resin component of an isocyanate-functional urethane prepolymer or a blocked-isocyanate functional urethane prepolymer. Generablly, such isocyanate-functional urethanes will be prepared by reacting a polyol, polyether, hydroxyl-terminated polyester, polyester amide, polyamine, or other polyfunctional active hydrogen compound with a diisocyanate or other polysicoyanate having up to eight functional isocyanate groups. Preferred reactants include polyhydroxy polyesters, polyhydroxy polyethers and polyisocyanates having two or three reactive isocyanate groups. An extensive description of some of the useful techniques for preparing isocyanate-functional urethanes can be found in Saunders and Frisch: *Polyurethanes, Chemistry and Technology*, Part II, Interscience (New York 1964), especially at pages 8 to 49, and in the references cited therein. Other preparative techniques which are known in the art can also be employed. Generally, any isocyanate-functional urethane known in the art can be employed in the practice of this invention, wich such urethanes having a molecular weight of at least 500, particularly in the range of 1,000 to 10,000 being preferred.

Any of the polyisocyanates having at least two reactive isocyanate groups can be employed in forming isocyanate-functional urethanes suitable for use in the practice of the invention. Such polyisocyanates include, without limitation, aliphatic polyisocyanates such as 1,6-hexamethylene diisocyanate; 1,8-octamethylene diisocyanate; 1,12-dodecamethylene diisocyanate; 2,2,4-trimethyl-hexamethylene diisocyanate; and the like; 3,3'-diisocyanatodipropyl ether; 3-isocyanatomethyl-3,5,5'-trimethylcyclohexyl isocyanate; cyclopentalene-1,3-diisocyanate; cyclohexylene-1,4-diisocyanate; methyl 2,6-diisocyanatocaprolate; bis-(2-isocyanatoethyl)fumarate; 4-methyl-1,3-diisocyanatocyclohexane; trans-vinylene diisocyanate and similar unsaturated polyisocyanates; 4,4'-methylene-bis-(cyclohexyl-isocyanate) and related polyisocyanates; methane diisocyanates; bis-(2-isocyanatoethyl) carbonate and similar carbonate polyisocyanates; N,N'N''-tris-(6-isocyanatohexamethylene) biuret and related polyisocyanates; as well as other known polyisocyanates derived from aliphatic polyamines; aromatic polysicoyanates such as toluene diisocyanates; xylene diisocyanates; dianisidine diisocyanate; 4,4'-diphenylmethane diisocyanate; 1-ethoxy-2,4-diisocyanatobenzene; 1-chloro-2,4-diisocyanatobenzene; tris(4-isocyanatophenyl) methane; naphthalene diisocyanates; 4,4'-biphenyl diisocyanate; phenylene diisocyanates; 3,3'-dimethyl-4,4'-biphenyl diisocyanate; p-isocyanatobenzoyl isocyanates; tetrachloro-1,3-phenylene diisocyanate; and the like.

At the present time, the preferred isocyanate-functional urethanes are alkyl phenol block toluene diisocyanate or methylene diisocyanate polyether and polyester prepolymers in the 500–3,000 molecular weight range.

In forming the blocked urethanes, the isocyanate-functional urethanes can be blocked employing conventional techniques with any of the known blocking agents, including, without limitation, monohydroxy compounds such as aliphatic and aromatic monalcohols, e.g., methanol, ethanol, isopropanol, phenol, and the like; or any compound containing enolizable hydrogen, such as acetoacetate ester, diethyl malonate, ethyl benzoyl malonate, acetyl acetone, acetynol acetone, and the like.

The adhesive compositions of the invention can also contain conventional additives normally found in epoxy adhesives, such as talc, metal powders, titanium dioxide, lubricants and plasticizers such as silicones, petroleum oils, glycerine, aromatic phthalates and the like, antioxidants, stabilizers and low molecular weight mono- and di-functional epoxy diluents such as butyl glycidyl ether, 1,4-butanediol diglycidyl ether and other alkyl glycidyl ethers of 8 to 16 carbon atoms. Such additives are incorporated in current ratios well known to practitioners in the art of epoxy adhesives.

In production, the epoxy resin compositions of the invention are provided as two-component compositions, i.e., a Component A and a Component B. The parts are metered, preferably in a suitable solvent, e.g., ethers, ether-esters, ether-alcohols, esters, alcohols, ketones, aromatic and aliphtic hydrocarbons and the like or blends thereof, and mixed together immediately before use in a weight ratio of Component A:Component B, ranging from 0.1:1 to 10:1, preferably 0.8:1 to 6:1. The resulting mixtures are curable at ambient temperatures but can be cured at temperatures in the range from 70° C. to 190° C., at which temperature cure is effected in les than 10 minutes depending on the temperature employed.

The two-component formulations of the present invention can be applied by any conventional method as by rollcoater, brush, curtain coater, extrusion, robotic dispensing machines and the like, but are preferably applied through airless spray applications. The formulations can be used to make flexible organic coatings, primers, membranes, sealants, laminates, as well as adhesives and exhibit good adhesion to a variety of substrates including moisture-contaminated steel.

The following examples are included to further illustrate the present invention.

EXAMPLE I

Formulation I was prepared by blending a Component A and a Component B, in ratio of approximately 1.6:1 by weight. The formulations which made up Component A and Component B were as follows:

| | Weight (Grams) |
|---|---|
| Component A | |
| B.P.A. Epoxy resin, WPE = 190[1] | 100.0 |
| Zinc phosphate (pigment) | 27.0 |
| Talc and TiO$_2$ | 91.0 |
| Solvent blend[2] | 46.5 |
| Component B | |
| ATBN copolymer[3] | 62.9 |
| Ketimine[4] | 27.0 |
| tris(dimethylaminomethyl)phenol catalyst | 3.0 |
| Fumed silica | 4.0 |
| Silicone oil | 2.0 |
| Solvent[5] | 62.0 |

[1]Bisphenol A epoxy resin (weight per equivalent = 190)
[2]0.9:1.0 blend of isopropanol and a glycol ether
[3]Piperizine-terminated butadiene/acrylonitrile copolymer rubber (total amine equivalent wt. = 1200 and acrylonitrile content = 10%
[4]Ketimine of diethylenetriamine and MIBK (amine value = 441–561)
[5]0.95:1.0 blend of isopropanol and a glycol ether Formulation I when mixed was found to have a four-hour pot life/working life, good recoatability and flexibility, good anti-corrosion, good tensile properties, good abrasion resistance (30 mg loss, Taber, CS-17, 1000 grams, 1000 cycles) and good chemical resistance. It also exhibited good adhesion to steel and aluminum substrates.

EXAMPLE II

Formulations II–VI were similarily prepared using ingredients of Component A and B of Example I with the following percentages of ATBN copolymer rubber on total weight of the hardener: 0, 52.9, 63.0, 87.5, and 100. The resulting Formulations were mixed and applied to aluminum substrates then drawn down to a 15 mil. thickness. The drawdowns were at 50% relative humidity, 77° F., using the Gardner dry time recorder. The results of the cure rates are reported in FIG. 1. As can be seen from FIG. 1, the cure rates of blends of the ketimine/ATBN based on hard dry (HD=3) and mar-free (MF=3) were both significantly faster than either curing agent alone.

It is claimed:

1. A two-component epoxy resin composition comprising a mixture of:
   A. an epoxy resin component, and
   B. a hardener component for curing Component A comprising a mixture of a ketimine and an amine-terminated butadiene/acrylonitrile copolymer rubber in a weight ratio of ketimine to said copolymer rubber of 47.1 to 12.5:52.9 to 87.5.

2. An epoxy resin composition according to claim 1, wherein the epoxy resin component comprises a glycidyl polyether or polyester having an epoxide equivalent of about 100 to 2000.

3. An epoxy resin composition according to claim 1, wherein the epoxy resin component comprises glycidyl ether of bis(4-hydroxyphenyl)-2,2-propane.

4. An epoxy resin composition according to claim 1, wherein the ketimine is a ketimine of diethylene triamine and methylisobutylketone.

5. An epoxy resin composition according to claim 4, wherein the ketimine has an amine value of about 350 to 750.

6. An epoxy resin composition according to claim 1, wherein the amine-terminated butadiene/acrylonitrile copolymer rubber is a piperazine-terminated butadiene/acrylonitrile copolymer rubber.

7. An epoxy resin composition according to claim 6 wherein the amine-termined butadiene/acrylonitrile copolymer rubber comprises an acrylonitrile content of about 5 to 20% by weight and a butadiene content of about 95 to 80% by weight, based on the butadiene/acrylonitrile copolymer.

8. An epoxy resin composition according to claim 1, wherein the weight ratio of ketimine to copolymer rubber is 47.1 to 12.5:52.9 to 87.5.

9. An epoxy resin composition according to claim 1, wherein the ketimine is a ketimine of diethylene triamine and methylisobutylketone and the copolymer rubber is piperazine-terminated butadiene/acrylonitrile copolymer rubber.

10. An epoxy resin composition according to claim 9, wherein the weight ratio of ketimine to copolymer rubber is 47.1 to 12.5:52.9 to 87.5.

11. An epoxy resin composition according to claim 10, wherein the epoxy resin component comprises glycidyl ether of bis(4-hydroxyphenyl)-2,2-propane.

* * * * *